M. MAKOWSKY.
COMBINATION CHECK AND STOP VALVE.
APPLICATION FILED JULY 25, 1912.
1,072,245.
Patented Sept. 2, 1913.
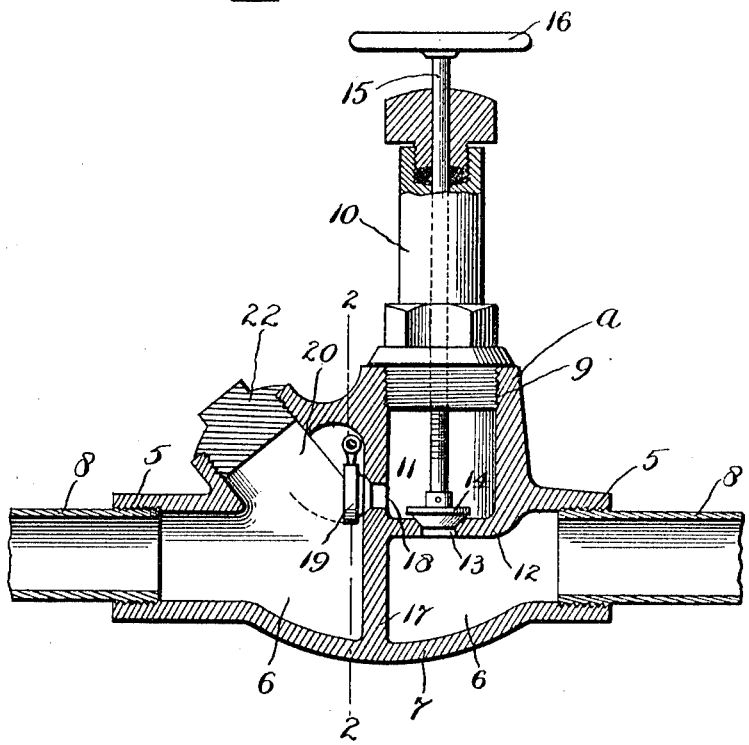
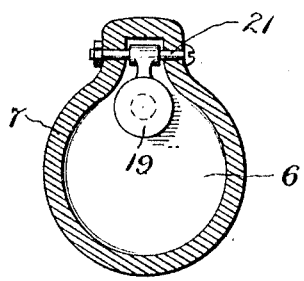
Witnesses:
Inventor
Michael Makowsky
By his Attorney

UNITED STATES PATENT OFFICE.

MICHAEL MAKOWSKY, OF PASSAIC, NEW JERSEY.

COMBINATION CHECK AND STOP VALVE.

1,072,245.  Specification of Letters Patent.  Patented Sept. 2, 1913.

Application filed July 25, 1912. Serial No. 711,484.

*To all whom it may concern:*

Be it known that I, MICHAEL MAKOWSKY, a citizen of the United States, residing at Passaic, in the county of Passaic and State of New Jersey, have invented new and useful Improvements in Combination Check and Stop Valves, of which the following is a specification.

The general object of the invention is to embody in a unitary structure the usual devices which are at present employed for controlling the passage of the feed water to and from a point where such water is to be used, such as a steam boiler. And to this end the invention consists in connecting a stop and a check valve in a peculiarly constructed pipe fitting or coupler.

Other objects will appear and be better understood from that embodiment of my invention of which the following is a specification, reference being had to the accompanying drawings forming part hereof, in which:—

Figure 1 is a view partly in side elevation and vertical section showing the device in use. Fig. 2 is a vertical cross section on the line 2—2 of Fig. 1.

The fitting designated generally by *a* may be of any metal found suitable for the purpose such as brass, and the several parts of this fitting may be of castings or the said parts may be machined or the fitting may be made up of cast and machined parts.

Any preferred or ordinary form of connection which will admit of the parts being readily detached whenever desired such as interfitting screw threaded portions 5—5, may be used for connecting the passages 6—6 of the coupler 7 with the feed water pipe sections 8—8. So too, may any preferred or well-known form of connection such as screw threaded portions 9, be employed for connecting the valve bonnet 10 with the chamber 11 arranged in angular relation to the passages 6—6.

The partition 12 which separates one of the passages 6 from the valve chamber 11, has a port 13 provided with a valve seat for the stop valve 14 which is operated by the stem 15 and handle 16 to control communication between the passage 6 and chamber 11 through the port 13.

The partition 17 which divides the passages 6—6 and one of these from the chamber 11, has a port 18 leading from the chamber 11 into one of the passages 6 and this port has a valve seat for a pivotally mounted check valve 19 arranged to be operated by gravity and to yield or open under pressure in the chamber 11, but to close when the head or pressure in the chamber 11 is less than that in the passage 6 on the left in Fig. 1.

A passage 20 arranged in oblique alinement to the check valve 19, serves as a handhole through which access may be had to the check valve 19 whenever it is desired to remedy any defect in the operation of the check valve or to admit of mounting this element on or dismounting it from the pivot pin 21. The threaded plug 22 is adapted to be screwed into the passage 20 so as to seal the same when the device is in use, as shown in Fig. 1.

In use and with the stop valve 14 open, the water passes through the pipe section on the right in Fig. 1 into the adjacent passage 6 from which it rises through the port 13 into the chamber 11 and thence passes through the port 18 and by the check valve 19 into the passage 6 on the left in Fig. 1 and into the adjacent pipe section 8 and from there to the boiler (not shown) or other point of use. When the pressure on the water in the boiler is such as to cause the water to back into the passage 6 on the left in Fig. 1, then the check valve will close and prevent the passage of such back water into the pipe section 8.

In the structure just described it will be observed that the arrangement and construction of the several parts are such as to render the device cheaper and none the less effective than two fittings, one of which contains the stop and the other the check valve.

What is claimed as new is:

A valve comprising a casing having an inlet opening and an outlet opening, a partition located in the casing between said openings and disposed transversely thereof, a second partition extending from the first mentioned partition to the side of the casing and at one side of the inlet opening, the second mentioned partition being provided with an opening, a positively movable valve adapted to close said opening, the first mentioned partition having at a point above the second mentioned partition an opening, and a check valve pivotally mounted upon the first mentioned partition at the side opposite the side thereof adjacent which the first mentioned valve is located and adapted to normally close the opening in the first mentioned partition.

In testimony whereof I affix my signature in presence of two witnesses.

MICHAEL MAKOWSKY.

Witnesses:
 THEO. LIPINSKY,
 GEO. A. BYRNE.

Copies of this patent may be obtained for five cents each, by addressing the "Commissioner of Patents, Washington, D. C."